United States Patent [19]

Rodseth

[11] 4,430,035

[45] Feb. 7, 1984

[54] FASTENER DRIVER HEAD AND TOOL AND COUPLING THEREBETWEEN

[75] Inventor: William G. Rodseth, Elgin, Ill.

[73] Assignee: Illinois Tool Works Inc., Chicago, Ill.

[21] Appl. No.: 288,423

[22] Filed: Jul. 30, 1981

[51] Int. Cl.³ ............................................. F16B 23/00
[52] U.S. Cl. ..................... 411/402; 403/359; 411/409; 411/410; 81/90 C; 81/121 R; 440/64
[58] Field of Search ............... 411/402, 409, 410, 910; 403/359; 464/157, 158, 159, 106; 440/64; 81/90 C, 121 R, 119, 436, 460, 461

[56] References Cited

U.S. PATENT DOCUMENTS 2,715,325  8/1955  DuPont .............................. 464/106

FOREIGN PATENT DOCUMENTS 6701     12/1906  France ................................. 411/402
1119193   5/1968  United Kingdom ................ 411/402

*Primary Examiner*—Wayne L. Shedd
*Attorney, Agent, or Firm*—Donald D. Mondul; Thomas W. Buckman

[57] ABSTRACT

A coupling arrangement includes a fastener driver head and a mating tool drive socket. The fastener driver head comprises a substantially circular disc-shaped base portion, a plurality of frustoconical portions integrally formed with the base portion and concentrically located within one surface thereof. A plurality of ribs are integrally formed with the base portion and alternating with the frustoconical portions and extend axially outwardly of both the base portion and the frustoconical portions. Each of the ribs extends from a line parallel with and spaced above a given diameter of the base portion to an outer periphery of said base portion. A mating drive tool has a recessed driving head or socket substantially complementary with the fastener head for closely interfitting engagement therewith.

8 Claims, 17 Drawing Figures

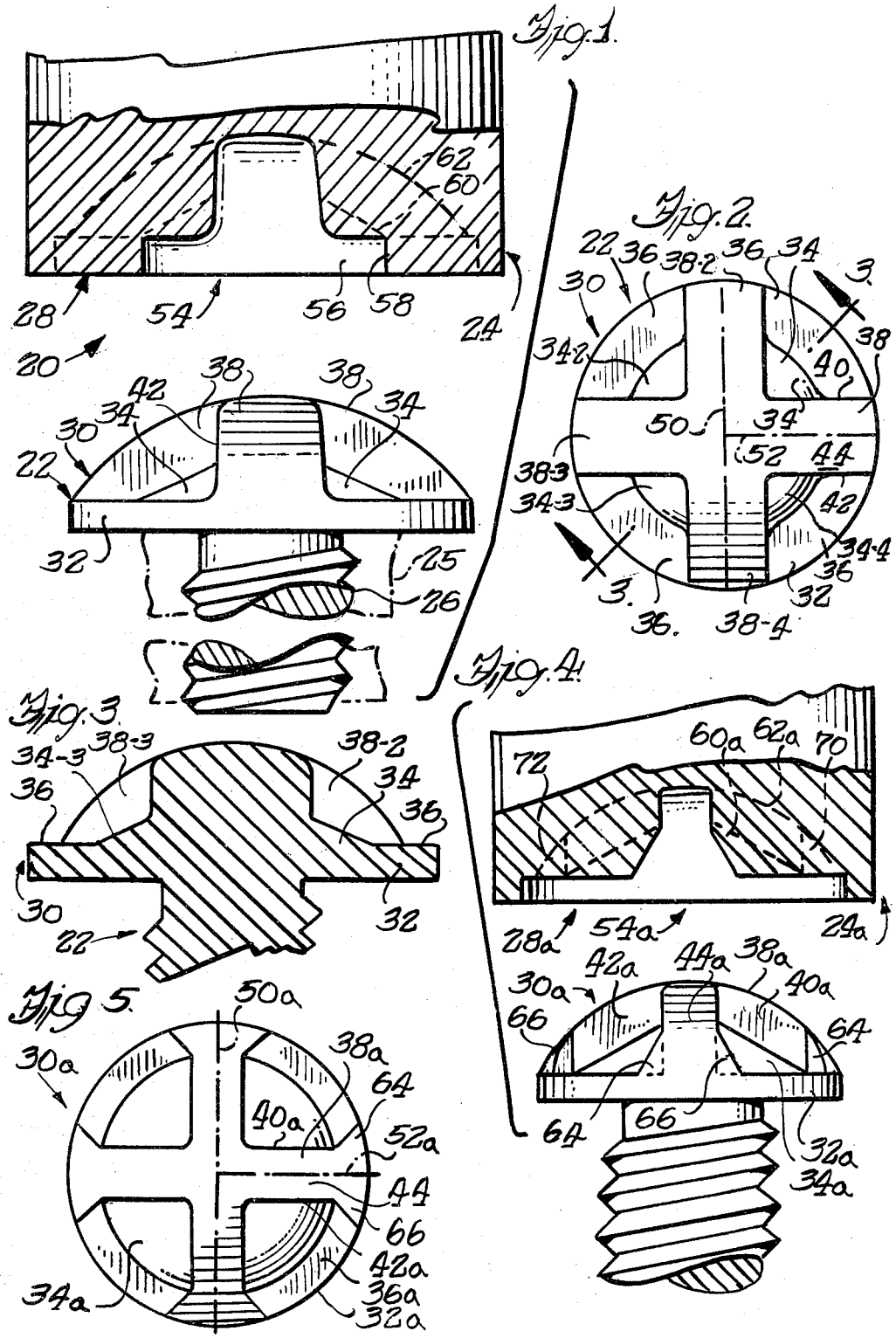

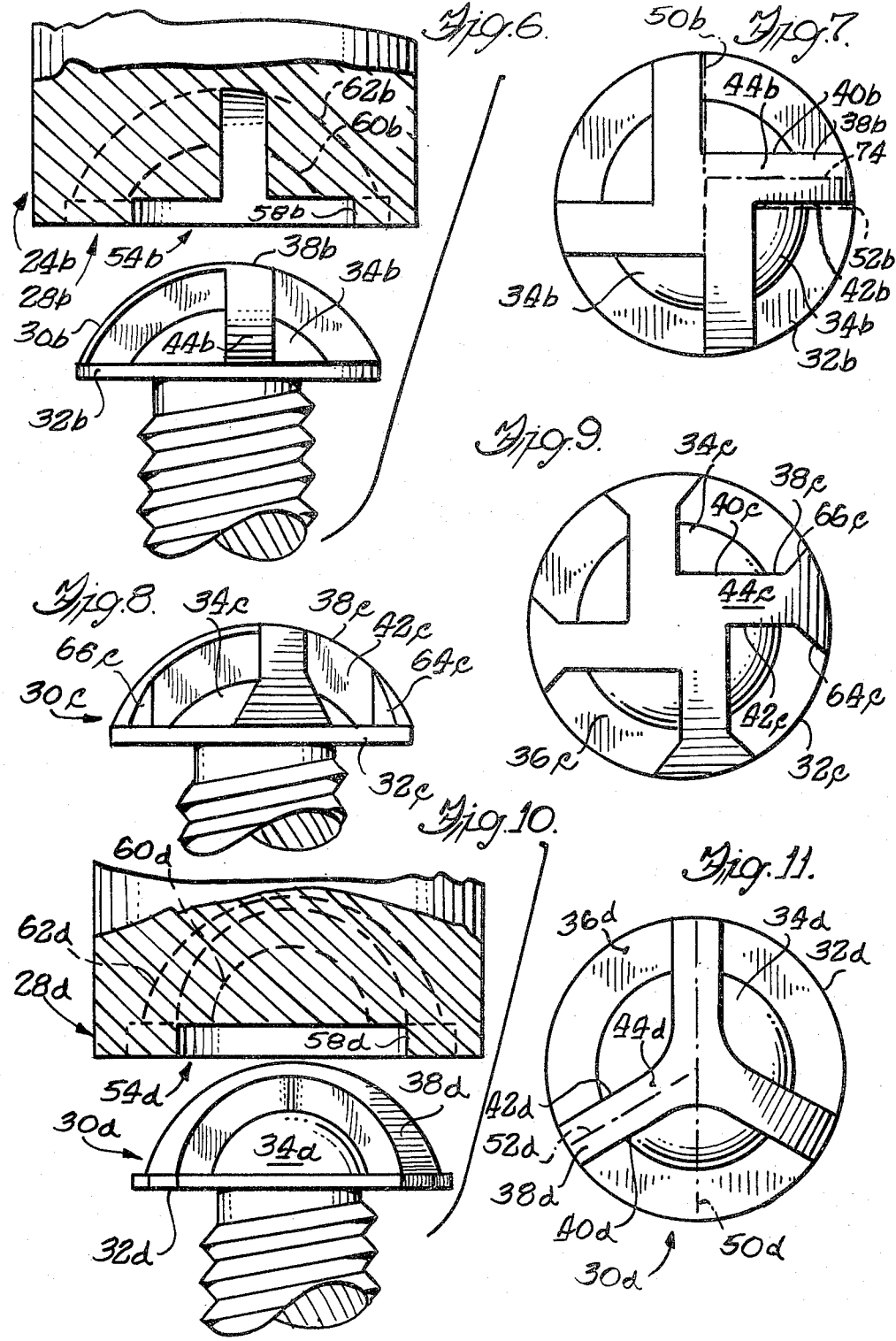

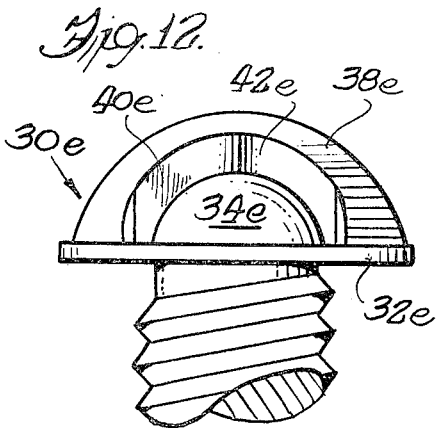
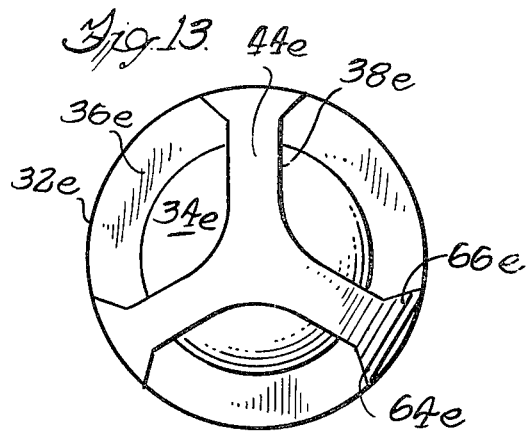
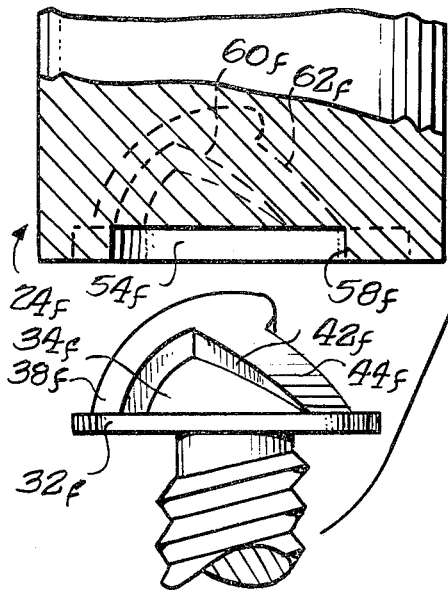
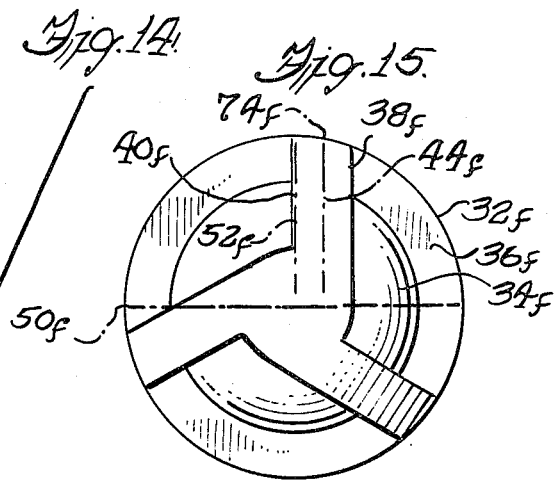
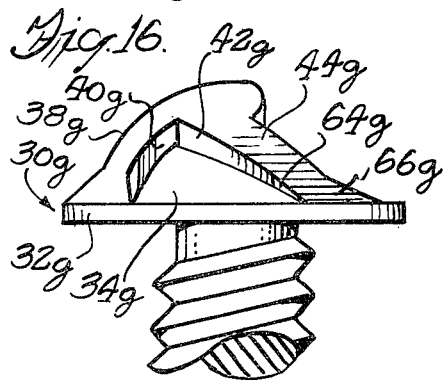
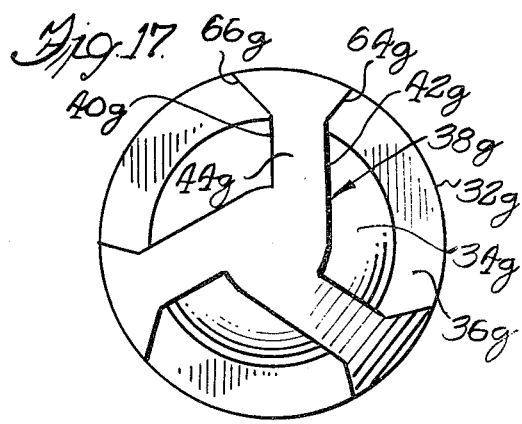

FASTENER DRIVER HEAD AND TOOL AND COUPLING THEREBETWEEN

BACKGROUND OF THE INVENTION

This invention relates to a coupling suitable for a torque-driving connection between elements such as a tool driver head and a driver head of a fastener such as a bolt or screw.

Many fastener head and tool coupling arrangements are known in the art. Common examples of such arrangements are a straight-slotted screw head and ordinary screwdriver, a Phillips-head screw and driver, and a hex-head bolt or screw and driver. However, each of these common types of driver head and tool configurations exhibit certain disadvantages in given applications. For example, in many applications a considerable amount of torque must be transmitted from the drive tool to the fastener to guarantee a relatively vibration resistant and permanent coupling of workpieces or the like by the fastener. Moreover, it is often desirable to provide a relatively tamperproof fastener, such that only a specially configured tool may be used to remove the fastener and hence prohibit tampering or unauthorized removal.

With conventional slotted drive heads, there is a marked tendency to cam out or otherwise destroy or deform the head, primarily due to the relatively insecure coupling between the drive tool and the driver head of the fastener. Such damage becomes increasingly likely as the torque applied by the tool increases. Moreover, many different tools or other objects may readily be fitted in the conventional slotted type of driver head. Hence, this type of driver head is not particularly suitable for high torque and/or tamperproof applications. The conventional Phillips arrangement offers some improvement. However, Phillips-type drive tools in various sizes are widely available, and the mismatching of size between driving tool and driver head can result in similar camming out or damage to the driver head in high torque applications. Moreover, the generally wide distribution and availability of Phillips-type drive tools makes the Phillips arrangement relatively unsuitable for tamperproof applications.

Additionally, slotted or otherwise recessed driver head configurations may be unsuitable in applications where foreign material, including corrosive liquids or the like are present. In such applications, these liquids or other materials may collect in the recessed-type of driver heads, causing deformation or other damage. As a result, the fasteners may become non-removable, or in some cases non-functional in achieving the desired fastening application.

In the conventional hexagonal configuration, the relatively large driving angle and point contacts between the engaged surfaces of the driver head and tool results in inefficient torque transmission therebetween. Moreover, some amount of tolerance is usually provided between the driver tool and the drive head whereby the units tend to be wedged apart and the stress risers or corners of the driven unit can be overstressed and deformed. These problems are overcome to a degree by enlarging the driver head and drive tools utilized, however, the coupling parts then tend to become relatively heavy and expensive. Moreover, conventional hexagonal driver tools are rather widely distributed, and additionally, conventional wrenches, pliers or the like may be also readily engaged with the drive surfaces of a conventional hexagonal head fastener. Hence, such fasteners are not particularly suitable for tamperproof applications.

Other coupling arrangements have been provided to overcome some of the foregoing problems in high torque and/or tamperproof applications. However, many such arrangements have proven relatively complex and expensive in their design and manufacture.

OBJECTS AND SUMMARY OF THE INVENTION

Accordingly, it is a general object of the invention to provide a novel and improved fastener driver head and mating tool and coupling therebetween.

A more specific object is to provide a driver head and tool of the foregoing type which exhibit efficient transmission of torque between tool and driver head for use in high torque applications.

Another object is to provide a driver head and tool of the foregoing type wherein the driver head cannot be readily gripped and rotated by other conventional tools, and hence is particularly suitable for tamperproof applications.

A further object is to provide a driver head configuration which provides no recesses where foreign materials, corrosive liquids or the like may collect, to thereby avoid corrosion and damage to the driver head and/or associated fastener.

A related object is to provide a driver head and mating tool of the foregoing type which are relatively simple and inexpensive in their design and manufacture and yet highly reliable in operation.

Briefly, and in accordance with the foregoing objects, a driver head according to the present invention comprises a substantially circular disc-shaped base portion, a plurality of frustoconical portions integrally formed with the base portion and concentrically located within one surface thereof and a plurality of ribs integrally formed with said base portion and alternating with said frustoconical portions and extending outwardly of both said base portion and said frustoconical portions at said one surface of said base portion, each of said ribs extending from a line parallel with and spaced above a given diameter of said base portion to an outer periphery of said base portion.

In accordance with another aspect of the invention a coupling is provided comprising a driver head of the foregoing type and a drive tool having a recessed driving head substantially complementary with the fastener head for closely interfitting engagement therewith.

BRIEF DESCRIPTION OF THE DRAWINGS

The foregoing, as well as other objects, features and advantages of the invention will become more readily apparent upon consideration of the following detailed description of the illustrated embodiments, together with reference to the several figures of drawings, wherein:

FIG. 1 is a side elevation, partially cut away, of a fastener with a driver head and an associated drive tool, in accordance with the invention;

FIG. 2 is a top plan view of the driver head of FIG. 1;

FIG. 3 is a sectional view taken generally along the line 3—3 of FIG. 2;

FIG. 4 is a side elevation showing an alternate embodiment of the driver head of FIG. 1, together with a drive tool therefor;

FIG. 5 is a top plan view of the driver head of FIG. 4;

FIG. 6 is a side elevation showing embodiment of a driver head, together with a mating tool;

FIG. 7 is a top plan view of the driver head of FIG. 6;

FIG. 8 is a side elevation showing alternate embodiment of the driver head of FIG. 6 and a tool therefor;

FIG. 9 is a top plan view of the driver head of FIG. 8;

FIG. 10 is a side elevation showing another embodiment of a driver head in accordance with the invention, together with a suitable tool therefor;

FIG. 11 is a top plan view of the driver head of FIG. 10;

FIG. 12 is a side elevation showing an alternate embodiment of the driver head of FIG. 10, together with a suitable tool therefor;

FIG. 13 is a top plan view of the driver head of FIG. 12;

FIG. 14 is a side elevation showing another embodiment of a driver head in accordance with the invention, together with a driver tool therefor;

FIG. 15 is a top plan view of the driver head of FIG. 14;

FIG. 16 is a side elevation showing an alternate embodiment of the driver head of FIG. 14, together with a suitable drive tool therefor; and FIG. 17 is a top plan view of the driver head of FIG. 16.

DETAILED DESCRIPTION OF THE ILLUSTRATED EMBODIMENT

The invention will initially be described with respect to a torque transmitting coupling arrangement such as may be provided between a driving unit and a complementary driven unit, for example a headed fastener device and a drive tool for use therewith. Preferably, the fastener comprises a fastener of the type which is rotated in one direction to achieve the fastening of one or more workpieces and rotated in the other direction to achieve removal thereof from the workpiece or workpieces, as for example a threaded fastener of screw.

Referring now to the drawings and initially to FIG. 1, there is seen a coupling designated generally by the reference numeral 20. This coupling 20 comprises a threaded fastener or screw designated generally by the reference numeral 22 and a driver tool designated generally by the reference numeral 24. The fastener or screw 24 may be used to fasten one or more workpieces 25, shown in phantom line. The threaded fastener or screw 22 may be provided with threads 26 in any of a number of known configurations, the threads 26 forming no part of the present invention. Similarly, the tool 24 may be hand-driven or machine-driven, and hence primarily a driver head portion or socket 28 of the tool 24 is illustrated, it being understood that any suitable drive means or mechanism may be used without departing from the invention. This tool driver head 28 has a complementary configuration to a driver head portion, designated generally by the reference numeral 30, of the fastener or screw 22. In the ensuing discussion, the driver head 30 of the fastener to screw 22 will be described, it being understood that the driver head portion or tip 28 of the tool 24 has a complementary configuration for interfitting with the driver head 30 for imparting rotational force or torque thereto.

Referring now also to FIG. 2 and FIG. 3, it will be seen that the driver head 30 of the fastener 22 of FIG. 1 comprises a substantially circular, disc-like base portion 32. At the top surface of this base portion 32, that is, the surface opposite from the threaded body portion 26 of the fastener 22, there is formed a second or intermediate portion designated generally by the reference numeral 34. This intermediate portion 34 comprises a plurality of segments of a frustrum of a cone 34-1, 34-2, 34-3 and 34-4, which will hereinafter be referred to by the general reference numeral 34 for ease of description. These frustoconical segments 34 are coaxially formed with the circular base portion 32 and define a smaller outer diameter than the base 32. Accordingly, between the outer periphery of the base 32 and the outer peripheries of the frustoconical segments 34 there are defined a plurality of radially outwardly extending skirt portions 36 which substantially define segments of an annulus. These annular segments 36 are of substantially the same arcuate extent as the respective frustoconical sections 34.

Intermediate each of the frustoconical segments 34 and its associated annular segment 36 there is formed an upstanding rib member 38. In the embodiment FIGS. 1 through 3, these ribs 38 are four in number and are substantially symmetrically formed with respect to the circular base portion 32. Hence, in the embodiment of FIG. 1, each of the frustoconical segments 34 defines a segment of a frustrum of a right cone. In this regard, each of the ribs 38 is defined by a pair of substantially parallel side wall portions 40, 42 which extend generally normal to the plane of the base 32 and terminate in an arcuate top surface 44. To facilitate illustration one such pair of side walls 40, 42 and top surface 44 are indicated in the drawings, it being understood that each of the ribs 38 of the embodiment of FIGS. 1 through 3 is substantially identical in configuration. The arc of the outer or top surface 44 extends generally from a point spaced above the center of the base 32 outwardly where it merges with the periphery of the base 32.

It will be noted that all of the driver head structure 30 including the base 32, frustoconical segments 34 and ribs 38 are integrally formed in the material of the fastener head portion 30.

Moreover, and with particular reference to FIG. 2, it will be seen that each of the ribs 38 extends substantially from a diameter of the base 32 to its periphery. Additionally, these ribs 38 are substantially symmetrically formed about respective radii of the base 32. In other words, each of the side walls 40, 42 is parallel with and equidistant from one radius of the base 32. The successive radii about which the respective ribs 38 is located are spaced apart, one from the next, by substantially 90° of arc.

In order to illustrate the foregoing relationships, in FIG. 2 one diameter 50 and one radius 52 are indicated in phantom line. It will be noted that one rib 38 thus extends radially outwardly from the diameter 50 and is substantially symmetrical about the radius 52.

It will be appreciated that the ribs 38 merge near the center of the fastener head 30, and hence are not readily separately identifiable near the center. However, it will be understood that the foregoing characterization of each rib 38 as extending "substantially from a diameter of the base 32 to its periphery" refers to the fact that there is no central "hub" portion of the fastener head 30, as in many prior art arrangements. Rather, the present invention is intended to maximize the area of the rib side walls 40, 42 available for transmission of torque between tool and fastener.

For purposes of illustrating a specific embodiment, the arc defined by the arcuate outer surface or top 44 of each of the ribs 38 defines substantially 60° or arc of a circle lying normal to the plane of the base 32. The angle defined between the frustoconical segments 34 and the plane of the base 32 is substantially on the order of 30° C.

Referring briefly to the tool 24 of FIG. 1, it will be seen that a recess designated generally 54 in the tool head 28 includes a first inwardly extending circular recess or portion 56 which is generally complementary with the base 32. A further, frustoconical recess 60 and a plurality of flutes 64 are complementary with the frustoconical segments 34 and ribs 38 of the fastener head 30 for closely interfitting therewith to impart rotational force or torque thereto. Hence, for each surface of the fastener head 30 a complementary internal or recessed surface is provided in the recess 54 of the tool head 28. Briefly, in this regard, the first recess 56 is generally disc-shaped defining an internal shoulder 58 for accommodating the base portion 32 of the head 30. Extending inwardly from this shoulder 58 or circular recess 56 are a plurality of recesses 60 defining a frustoconical surface for accommodating the frustoconical segments 34. Intermediate these recesses 60 are a plurality of deeper flutes or recesses 64 which generally define parallel wall portions terminating in arcuate or convex recesses for accommodating the ribs 38 of the fastener 30.

Referring next to FIG. 4 and FIG. 5 an alternate embodiment of the fastener driver head and tool head of FIG. 1 is illustrated. In this alternate embodiment, the parts are designated by the same reference numerals as similar parts in the embodiment of FIG. 1, followed by the letter "a". A tool head 28a and a fastener head 30a are both substantially identical in all respects to the tool head 28 and fastener head 30 of FIGS. 1 through 3. Accordingly, the fastener head 30 includes a substantially circular, disc-like base portion 32a, frustoconical segments 34a and four radially extending, symmetrical ribs 38a, formed substantially symmetrically about four radii of the base 32a, which are spaced apart by substantially 90° of arc. However, departing from the embodiment of FIGS. 1 through 3, the fastener driver head 30a of FIG. 4 further includes means for further strengthening the radially outer portions of the ribs 38a. This latter structure comprises a pair of substantially symmetrically flared-out portions 60, 62 which extend outwardly of the radially outermost part of each rib 38 and terminate in the periphery of the base portion 32.

Each of these flared-out parts 60, 62 has a top surface substantially continuous with and extending outwardly from the arcuate top surface 44 of its associated rib 38, and hence forms an angular outward extension of the otherwise flat, parallel side walls 40, 42 thereof. As a specific example, to which no limitation is intended, in the embodiment of FIGS. 4 and 5, it will be seen that the flared-out portions 60, 62 begin at a point in the respective side walls 40, 42 substantially immediately above the point where the frustoconical segments 34 terminate or run into the base portion 32, and extend outwardly and downwardly therefrom to join with and terminate in the outer periphery of the base portion 32. In other words these flared-out parts 60, 62 are of similar radial extent to the annular portions 36 of the base 32. Similarly, the driver head recess 54a of FIG. 4 includes similarly outwardly flared cutout portions 64, 66 to accommodate these flared-out portions 60, 62 of the ribs 38. In all other respects, the fastener driver head 30a and recess tool drive portion or socket 54a are substantially identical to those illustrated and described above with reference to FIGS. 1 through 3.

As mentioned above, the fastener head and mating tool head configurations of the invention are intended to transmit the maximum amount of torque between a tool and fastener. Hence, the substantially flat, parallel side wall portions 40, 42 of each of the ribs 38 extend substantially to its junction with the like side wall portions of the next rib 38, leaving substantially no center or "hub" portion apart from the ribs 38 themselves where the respective ribs 38 join near the center of the fastener head 30. Moreover, another object of the invention is to provide a substantially tamperproof fastener head, such that the fastener can be driven substantially only by the complementary tool, and not by other conventional and readily available tools such as screwdrivers, wrenches, pliers or the like. Additionally, it will be noted that the frustoconical segments 34 intermediate the ribs 38 encourage foreign materials, corrosive liquids or the like to run off of the fastener head 30, particularly when it is in a horizontal or near horizontal position, for example as illustrated in FIG. 1, thus avoiding the corrosive or damaging action of such substances upon the fastener drive head 30.

The invention is not limited to the embodiments heretofore illustrated and described. For example, the ribs 38 need not be symmetrically located about radii of the base portion 32, nor need these ribs 38 be four in number. Accordingly, FIGS. 6 through 17 illustrate similar views of alternate embodiments of fastener heads and mating drive tool sockets which may be provided in accordance with the invention.

Referring initially to FIG. 6 and FIG. 7, a further embodiment of a fastener driver head and tool and coupling therebetween is illustrated. To indicate parts which are functionally the same as in the previous embodiments, the same reference numerals are utilized in FIG. 6 and FIG. 7, followed by the letter "b". The fastener drive head of FIG. 6 and FIG. 7 includes a substantially circular disc-like base 32b substantially similar to that illustrated and described above with reference to FIGS. 1 through 5, inclusive. A plurality of conical segments 34b are substantially similar to the conical segments 34 described above with reference to the previous embodiments. However, in the embodiment of FIG. 6 and FIG. 7 the ribs 38b are offset somewhat from respective radii 52b of the base 32b. In this regard, with reference to FIG. 7 it will be noted that one side wall 42b of each of these ribs 38b is formed substantially along a radius 52b of the base 32b, whereby the ribs 38b are offset somewhat from respective radii of the base 32b. In the embodiment of FIG. 6 and FIG. 7 these ribs are four in number and the respective side walls 42b thereof each define a radius of the base 32 separated from the radius defined by the next succeeding side wall 42b by substantially 90° of arc. Hence, it can be said that each of these ribs 38b is symmetrical about an imaginary line such as the phantom line 74 which is offset somewhat from but substantially parallel with a radius 52b of the base 32.

In all other respects the ribs 38b are substantially similar in configuration to the ribs 38 described above with respect to the embodiment of FIGS. 1 through 3. It will also be noted that because these ribs 38b are offset from radii of the base 32b, the intermediate frustoconical segments 34b are not true segments, but rather are offset portions of a frustrum of a right cone. In all other respects, these segments or portions 34b are similar to the segments 34 of the embodiment of FIGS. 1 through 3. That is, the segments or portions 34b are all portions of the same frustrum of a right cone which is concentric with but has a smaller maximum diameter than the diameter of base portion 32.

The tool driver portion 28b of FIG. 6 is configured to mate with the fastener driver head 30b and hence the recess or drive socket portion 54b thereof carries similarly offset indentations 60b and 62b for accommodating the frustoconical segments 34b and ribs 38b of the fastener head 30b. It will be appreciated that the offset of the ribs 38b of the embodimet of FIG. 6 and FIG. 7 further enhances the tamperproof nature of the fastener drive head of the invention, making gripping by conventional tools such as pliers or the like difficult.

FIG. 8 and FIG. 9 show a second form of the driver head 32b of FIG. 6 and FIG. 7, and like reference numerals, followed by the letter "c" have been used. In FIG. 8 and FIG. 9, flared-out end portions 64c and 66c have been added to each of the ribs 38c in the same fashion and for the same purpose as the flared-out parts 64, 66 embodiment of FIG. 4 and FIG. 5, illustrated and described above. In all other respects, the base portion 32c, conical segments 34c, and ribs 38c of the embodiment of FIG. 8 and FIG. 9 are substantially identical to those described above with reference to FIG. 6 and FIG. 7. It will be noted that the flared-out portions 64c, 66c of each of the ribs 38c extend from a point intermediate the junction of the base 32c with the frustoconical segments 34c outwardly to the periphery of the base 32c, rather than spanning the entire distance between the periphery of the base 32c and the junction therewith of the segments 34c. Although the effective extent of these flared-out portions 64c, 66c is substantially identical to the flared-out parts 64, 66 of FIG. 4 and FIG. 5, it will be noted that the offset of the ribs 38c is such that a relatively greater proportion thereof extends between the base of the segments 34c and periphery of the base 32c, such that the effective extent of the flared-out parts 64c, 66c with respect to the skirt portion 36c of the base 32c is maintained.

Referring now to FIG. 10 and FIG. 11 a further embodiment of a fastener head and mating driver tool is illustrated, and like reference numerals followed by the letter "d" are utilized. The embodiment of FIG. 10 and FIG. 11 is substantially similar to the embodiment of FIG. 1, in that a driver head 30d is provided which includes a substantially circular, disc-shaped base portion 32d which carries a plurality of frustoconical segments 34d aligned substantially concentrically within the top surface thereof. The ribs 38d in the embodiment of FIG. 10 and FIG. 11 are three in number, however. In similar fashion to the ribs 38 of FIGS. 1 through 3, each of the ribs 38d extends inwardly substantially to a given diameter 50d of the base 32d and is formed substantially symmetrically about a given radius 52d of the base 32d. Additionally, the respective radii 52d about which respective ribs 38d are formed are spaced apart by substantially 120° of arc. Hence, each of the frustoconical segments 34d similarly defines substantially 120° of arc of a frustrum of a right cone. Accordingly, the recessed driver portion or socket 54d of the tool head 28d is formed with a like number and configuration of recesses for mating with the fastener head 30d just described.

Referring briefly to FIG. 12 and FIG. 13 an alternate embodiment of the fastener head of FIGS. 10 and 11 is illustrated, and like reference numerals, followed by the letter "e" are utilized. This fastener head is substantially identical in all respects to the fastener head 30d, in that it includes three radially extending ribs 38e carried upon a base 32e and intermediate frustoconical segments 34e. However, the ribs 38e each terminates in a pair of outwardly flared portions 64e, 66e as with the previous embodiments of FIGS. 4 and 5, and of FIGS. 8 and 9, respectively. As with the embodiment of FIGS. 8 and 9, it will be seen that these flared-out portions 64e, 66e extend from a point intermediate the termination of the frustoconical segments 34e and the periphery of the base portion 32. It will be recognized that the mating tool drive socket (not shown) will include like flared-out recesses for accommodating these flared-out rib terminal end portions 64e, 66e, and hence need not be again illustrated.

Referring next to FIGS. 14 and 15, a further embodiment of a fastener driver head and mating tool drive socket are illustrated, utilizing like reference numerals, followed by the letter "f". As in the embodiment of FIG. 10 and 11, the ribs 38f are three in number, but as in the embodiment of FIG. 6 and FIG. 7 these ribs are offset somewhat, rather than being radially directed. Accordingly, it will be seen that the frustoconical segments 34f are not true segments but are also offset to the same extent as the ribs 38f therebetween. As in the embodiment of FIG. 6 and FIG. 7, the ribs 38f are formed substantially symmetrically about lines 74f parallel with and offset somewhat from respective radii 52f of the base 32f. However in the embodiment of FIGS. 14 and 15, these radii 52f of the base 32f are successively spaced apart by substantially 120° of arc.

Referring finally to FIG. 16 and FIG. 17, an alternate form of the fastener driver head of FIGS. 14 and 15 is illustrated. This driver head is substantially identical in all respects to the driver head of FIGS. 14 and 15, and hence like reference numerals, followed by the letter "g" are utilized. However, each of the ribs 38g is provided with flared-out ends 64g, 66g, similar to those described above with reference to FIG. 4 and FIG. 5, and with reference to FIG. 8 and FIG. 9, and with reference to FIG. 12 and FIG. 13 hereinabove.

It will be noted that the "three-rib" configuration of the foregoing FIGS. 10 through 17, inclusive, and the offset configuration thereof of FIGS. 14 through 17, inclusive, further enhance the tamperproof feature of the fastener drive head of the invention. These configurations are difficult to grasp with conventional tools, requiring the specialized tool drive socket configuration shown in conjunction therewith for proper coupling and torque transmission.

What has been illustrated and described herein is a novel and improved fastener drive head, together with a tool drive socket and coupling therebetween. Those skilled in the art may devise various alternatives, changes and modifications upon reading the foregoing descriptions. The invention include such alternatives, changes and modifications insofar as they fall within the spirit and scope of the appended claims.

The invention is claimed as follows:

1. A driver head for a fastener comprising: a substantially disc-shaped base portion, a plurality of dome-shaped portions integrally formed with said base portion and concentrically located within one surface thereof and a plurality of ribs integrally formed with said base portion and alternating with said frustoconical portions and extending outwardly thereof, each of said ribs extending substantially from a diameter of said base to the outer periphery thereof in a substantially symmetrical configuration.

2. A driver head according to claim 1 wherein each of said ribs terminates in a pair of outwardly flared portions adjacent to and merging with the outer periphery of said base portion.

3. A driver head according to claim 1 or claim 2, wherein each of said ribs comprises a pair of substantially flat, continuous parallel side wall surfaces substantially normal to the plane of said base portion first surface and defining an arcuate outer surface, each said arcuate outer surface extending from a line spaced above said base at the associated diameter to and merging with said base outer periphery, said arcuate outer surfaces extending outwardly of said dome-shaped portions.

4. A driver head according to claim 1 or claim 2 wherein said ribs are three in number, each rib being substantially symmetrical about one of three symmetrical radii of said base, said three symmetrical radii being respectively spaced apart one from the next by substantially 120° of arc.

5. A driver head according to claim 1 or claim 2 wherein said ribs are four in number, and each rib being substantially symmetrical about a line parallel with and spaced apart from one of four symmetrical radii of said base, said four symmetrical radii being respectively spaced apart one from the next by substantially 90° of arc.

6. A driver head according to claim 1 or claim 2 wherein said ribs are three in number, each being substantially symmetrical about a line parallel with and spaced apart from one of three symmetrical radii of said base, said three symmetrical radii being respectively spaced apart one from the next by substantially 120° of arc.

7. A driver head according to claim 1 or claim 2 wherein the number of said ribs is N and each rib being substantially symmetrical about one of N symmetrical radii of said base portion, said N symmetrical radii being spaced apart one from the next by substantially 360°/N of arc.

8. A driver head according to claim 1 or claim 2 wherein the number of said ribs is N, each of said ribs being substantially symmetrical about a line spaced apart and parallel from one of N symmetrical radii of said base, said N symmetrical radii being spaced apart one from the next by substantially 360°/N of arc.

* * * * *